: 3,119,001
COOKING APPLIANCE
Theodore E. Andrews, Orefield, Pa., assignor to General Electric Company, a corporation of New York
Filed Jan. 8, 1962, Ser. No. 164,775
10 Claims. (Cl. 219—19)

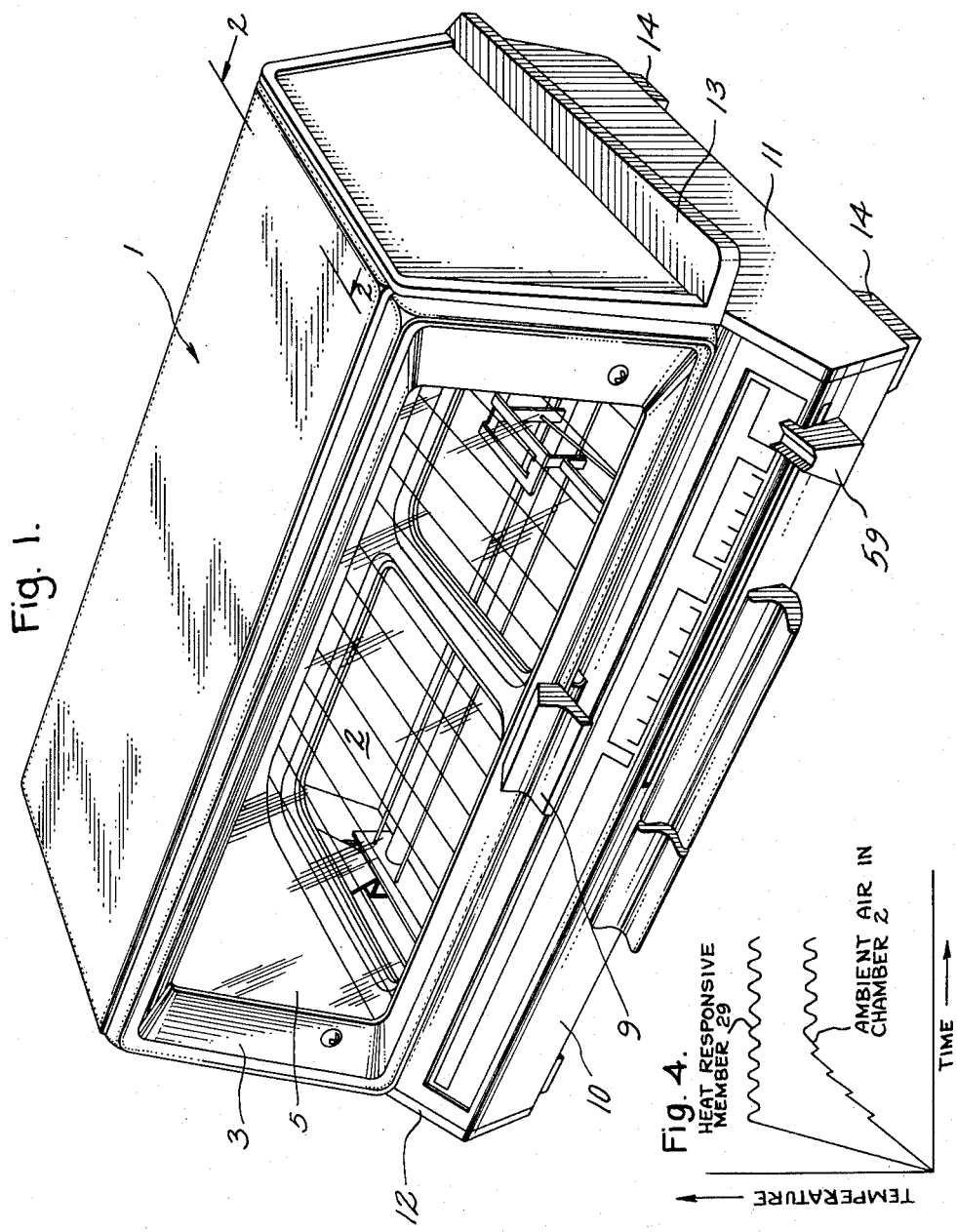
Jan. 21, 1964
T. E. ANDREWS
3,119,001
COOKING APPLIANCE
Filed Jan. 8, 1962
2 Sheets-Sheet 1
Inventor:
Theodore E. Andrews
by T G Dysart
His Attorney

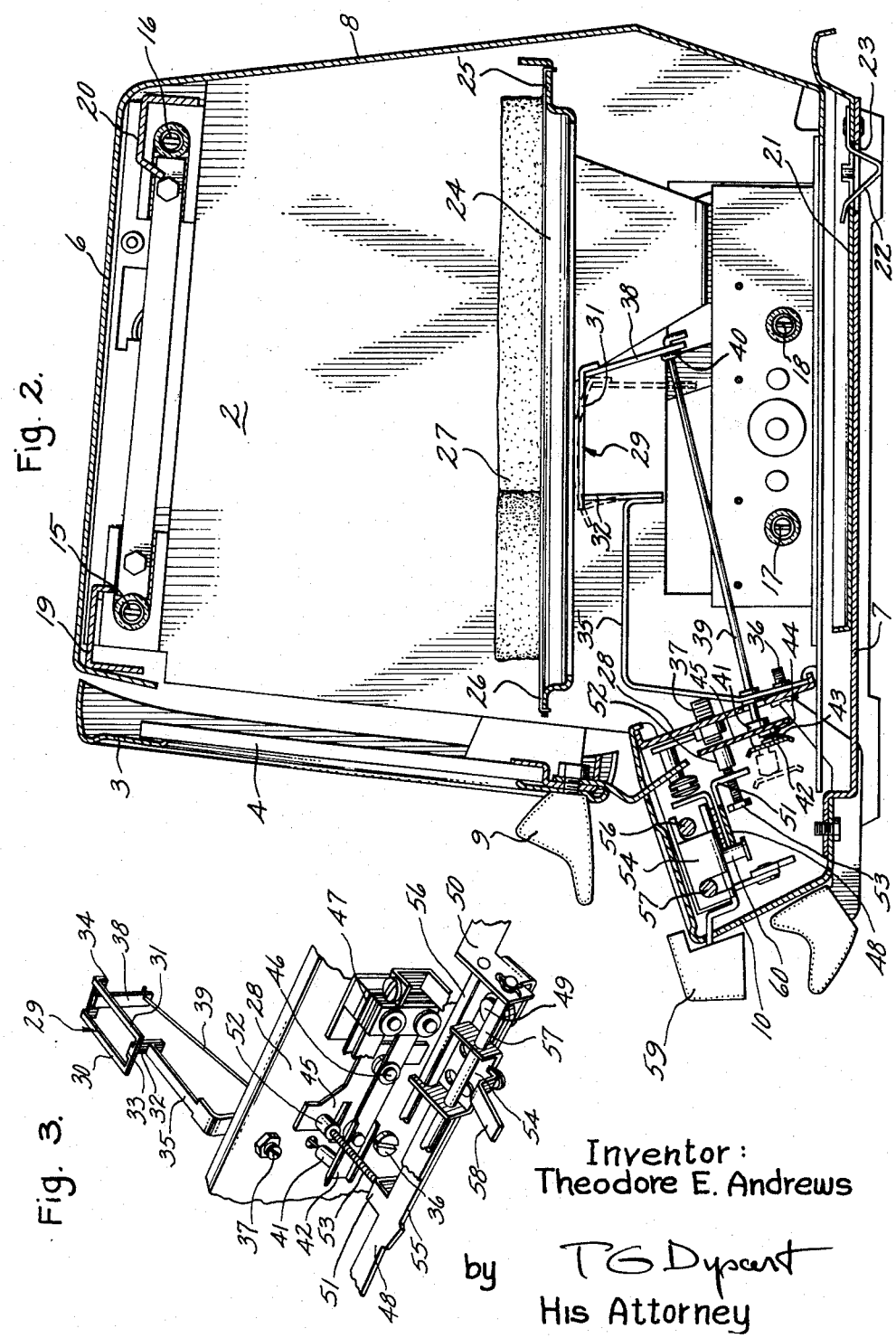

This invention relates to cooking appliances, and more particularly to a thermostatic device for sensing temperatures in a cooking appliance and for controlling the operation thereof.

The general object of the present invention is to provide an improved thermostatic device for cooking appliances which responds to the surface temperature of bread and the like during toasting operations.

Another object of the invention is to provide a thermostatic device of the aforesaid character which is simple, easy to manufacture and is operable to control successive toasting operations in a uniform manner.

Another object of the invention is to provide a thermostatic device for cooking appliances which is useful not only for controlling toasting operations but also for controlling air temperature in the cooking appliance during baking operations.

Briefly stated, in accordance with one aspect of this invention, there is provided a bimetallic thermostatic device mounted in a cooking appliance between a food supporting rack and heating means adjacent thereto. The thermostatic device includes a bimetallic arm portion arranged so as to be generally parallel and in face to face relationship to the surface of a slice of bread or the like supported on the rack, and also a compensating leg portion integral with the bimetallic arm portion but perpendicular thereto and extending toward the heating means. The end of the leg portion is secured to the body of the cooking appliance, and a switch actuator is secured to the arm portion so as to move through a range of positions as its temperature varies. In the preferred embodiment of the invention the bimetallic arm portion comprises a pair of laterally spaced relatively narrow bimetallic arms connected at their ends, thus minimizing the size of the "shadow" of the arm portions on the bread. Also, the bimetallic leg portion is located between the arms, and thus the bimetallic portions of the device may be stamped out of a single bimetallic sheet and then formed by bending the leg portion at right angles to the arms.

The subject matter which I regard as my invention is particularly pointed out and distinctly claimed in the concluding portion of this specification. However, the organization and method of operation of the invention, together with further objects and advantages thereof, may be best understood by reference to the following description taken in connection with the accompanying drawings in which:

FIG. 1 is a perspective view of a cooking appliance embodying the present invention;

FIG. 2 is an enlarged cross-sectional view taken along the line 2—2 in FIG. 1;

FIG. 3 is a fragmentary perspective view showing certain parts of the cooking appliance; and FIG. 4 is a graphical illustration of certain temperature changes when the appliance is used for baking.

Referring to the drawings, the numeral 1 generally designates a portable cooking appliance having a cooking chamber 2 therein provided with a front opening which may be closed by a pivotally mounted door 3. Door 3 is preferably provided with a heat resistant glass window 4 so that the interior of the cooking chamber can be observed during cooking operations. Cooking chamber 2 is formed by a pair of side walls 5, top wall 6, bottom wall 7 and rear wall 8, all of which are preferably formed from sheet metal. Extending forwardly from the plane of door 3 and immediately below door handle 9 secured thereto is a protruding wall member 10 forming a compartment in which various control components are located. Walls 6, 7 and 8 extend outwardly beyond side walls 5, thus providing space for a door and food supporting rack linkage arrangement (not shown). A pair of end closure members 11 and 12 which are preferably made of a molded plastic material are secured to the respective extending end portions of walls 6, 7 and 8 so as to completely enclose the aforesaid linkage arrangement. End closure member 11 is formed with a handle portion 13 and feet 14, and of course closure member 12 is formed in a similar manner.

Mounted within cooking chamber 2 adjacent top wall 6 are a pair of electric heating elements 15 and 16 and a similar pair of electric heating elements 17 and 18 are mounted adjacent bottom wall 7. Heating units 15, 16, 17 and 18 are formed from coiled resistance wire enclosed within an elongated quartz tubular member, and extends substantially the entire width of the cooking chamber. The heating elements are secured in fixed relation to the walls of the cooking chamber and their terminals extend through side walls 5. Thus the electrical wiring for supplying current to the heating units may be located in the space enclosed by end closures 11 and 12. Heating units 15 and 16 are arranged to radiate heat downwardly into the cooking chamber 2, and accordingly elongated reflectors 19 and 20 are mounted in the upper portion of the chamber adjacent top wall 6. It will be understood that reflectors 19 and 20 extend along substantially the entire width of the cooking chamber and cooperate with heating elements 15 and 16, respectively. Heating elements 17 and 18 function to radiate heat upwardly into the cooking chamber, and are aided in this respect by a combination reflector and crumb tray 21 which is removably supported on bottom wall 7. Preferably a spring latch 22 is mounted on crumb tray 21 so as to cooperate with an aperture 23 in the bottom wall 7 so that it is releasably retained in the position shown in FIG. 2.

A horizontal food supporting rack 24 is positioned in cooking chamber 2 in an intermediate location between upper heating units 15 and 16 and lower heating units 17 and 18. In order to permit articles of food supported on rack 24 to be heated from the bottom as well as the top, the rack comprises a rectangular frame 25 and a plurality of parallel lengths 26 of stainless steel wire secured under tension to the front and rear edges of the rack. Thus when a slice of bread or the like 27 is being toasted, as illustrated in FIG. 2, its bottom surface is exposed to radiation from heating elements 17 and 18 and receives substantially the same amount of radiation as does the top surface from heating elements 15 and 16. Food rack 24 is supported in cooking chamber 2 in the position shown in FIG. 2 by the aforesaid linkage arrangement (not shown). It will be understood that door 3 remains in the closed position shown in FIG. 2 during cooking operations, but that it may be open so that food may be placed on or removed from rack 24. Since the door mounting arrangement and the rack supporting arrangement do not form a part of the present invention they will not be described in detail.

The control components of cooking appliance 1 are supported on a rectangular mounting plate 28 which forms the lower front wall of cooking chamber 2. Mounting plate 28 is secured to side walls 5 and extends across substantially the entire width of the appliance. In accordance with the present invention, energization of heating units 15, 16, 17 and 18 is thermostatically controlled by a bimetallic heat responsive member or thermostat 29 which is mounted in spaced relation between lower heating units 17 and 18 and the bottom surface food rack 24.

As shown in FIG. 2, thermostat 29 is in close proximity to the bottom of food rack 24 but it is sufficiently spaced therefrom that it never makes contact with either the rack or food supported thereon. Thermostat 29 is preferably stamped from a single sheet of bimetallic material and includes a pair of laterally spaced relatively narrow arm portions 30 and 31 arranged in generally parallel face to face relation to the food rack, a downwardly extending compensating leg portion 32 which is substantially perpendicular to arms 30 and 31, a connecting end portion 33, and a flanged end portion 34.

An angle bracket 35 secured at one end to mounting plate 28 by means such as a screw 36 supports thermostat 29 in the position described above and illustrated in FIG. 2. The free end portion of bracket 35 is bent so that it may be secured to downwardly extending leg 32 of the thermostat, the connection preferably being made by spot welding. For purposes of adjustment during assembly, bracket 35 and hence thermostat 29 may be shifted through a limited range of positions by turning a set screw 37 extending through mounting plate 28 so as to bear against the adjacent portion of bracket 35. Thus thermostat 29 may be positioned in proper relationship to rack 25.

A downwardly extending actuator arm 38 is suitably secured to flanged end portion 34 of thermostat 29, by spot welding for example, and its lower end is in turn secured to an actuator rod 39. Preferably a collar 40 is fixedly secured adjacent the end of rod 39 which extends through an opening in actuator arm 38 and is then bent over, as shown in FIG. 2. Thermostat 29 is formed so that its high expansion side faces food rack 24 and hence as it rises in temperature it flexes in the manner indicated in broken lines in FIG. 2, thus causing actuator rod 39 to move longitudinally.

It will now be apparent that during toasting operations the thermostat 29 is subjected to heat radiated upwardly by heating units 17 and 18 and receives heat radiated downwardly by the surface of the food being toasted. It is also heated by ambient air temperature. Since ambient air temperature varies during a series of successive toasting operations means for compensating for such variations are required. Also, the heat received by thermostat 29 from heating units 18 and 19 must be compensated for. Compensating leg 32 serves these purposes since it bows toward the position indicated in broken lines in FIG. 2 when heated. By virtue of its vertical position, leg 32 receives relatively little radiated heat from the food and is primarily responsive to air temperature and heat radiated from heating elements 17 and 18. During toasting operations the heat received by bimetallic arms 30 and 31 from heating units 17 and 18 is substantially constant while the heat received from the food being toasted varies in accordance with its brownness. Thus at any moment during a toasting operation the position of thermostat 29 and actuator rod 39 is a function of the brownness of the food. Therefore, the movement of rod 39 can be utilized to terminate a toasting cycle when the toast reaches a predetermined degree of brownness, or otherwise to control the operation of cooking appliance 1.

It should be understood that compensating leg 32 does not fully compensate for the heat energy received by thermostat 29 from heating units 17 and 18, and in fact it is desirable that it not do so for two reasons.

First, the heat energy transmitted by the surface of the toast is relatively low in magnitude and is insufficient to actuate thermostat 29 through the range of movement required for switch actuation. The additional energy required for this purpose is supplied by heating units 17 and 18.

Second, thermostat 29 may be used in a cooking appliance control system adapted to control the appliance during baking operations as well as toasting operations. Such a cooking appliance is disclosed and claimed in application Serial No. 164,774 filed January 8, 1962, by Joseph F. Loch et al. and assigned to the assignee of the present application. When thermostat 29 is used as a baking oven control the food is supported in chamber 2 so that it is not in heat transfer relation with the thermostat, for example by means of an imperforate tray (not shown) arranged to rest on rack 24 so as to shield and space the food from the thermostat. Under these circumstances thermostat 29 receives heat by conduction from the surrounding air and also heat radiated from heating units 17 and 18, but primarily from the latter. Since the movement of compensating leg 32 only partially compensates for the movement of arms 30 and 31 thermostat 29 flexes towards the position indicated in broken lines in FIG. 2 when heating units 17 and 18 are energized and returns toward the position shown in full lines when the heating units are de-energized. By arranging actuator rod 39 to operate a manually positioned switch connected in series with the heating units, as described below, the air temperature in chamber 2 may be maintained substantially at a predetermined level.

In the embodiment of the invention disclosed herein actuator rod 39 extends through an aperture in mounting plate 28 and is provided at its free end with an insulated tip 41 arranged to engage a flexible switch arm 42. Mounted on flexible arm 42 is a contact 43 arranged to mate with a contact 44 mounted on a support member 45. Support 45 is mounted on flexible arm 42 by a fastener 46 located in spaced relation with respect to the fixed end of arm 42, which is secured in fixed relation to switch stack 47. Fastener 46 includes suitable insulating material for electrically insulating support 45 from the flexible arm 42.

Manual selection of the temperature at which actuator rod 39 causes contacts 43 and 44 to open is provided by an elongated cam 48 pivotally mounted by means of a pivot pin 49 on a flanged portion 50 of mounting plate 28. It will be understood that flange 50 is bent at right angles to and extends forwardly from the right end portion of mounting plate 28, as viewed in FIG. 3. The function of cam 48 is of course to position arm 42 and support 45 throughout a range of positions with respect to actuator tip 41 so as to regulate the temperature at which thermostat 29 actuates contacts 43 and 44 between open and closed position. For this purpose a flange portion 51 extends from the rear of cam 48 and carries a projecting button 52 made of insulating material and arranged to engage contact support member 45. Flexible arm 42 is biased towards cam 48 so that support 45 is always in engagement with button 52 and exerts a force tending to pivot cam 48 away from mounting plate 28. Preferably button 52 is mounted on flange 51 by means of a screw 53 for purposes of calibration.

Cam 48 is arranged to be actuated by a cam actuator 54 mounted for sliding movement along cam surface 55. Thus cam actuator 54 is mounted for sliding movement on a pair of rods 56 and 57 which are fixedly secured at one end to flange 50 of mounting plate 28 and at the other ends to a bracket (not shown) secured to the mounting plate. Cam actuator 54 is free to slide along cam surface 55 of cam 48 and is provided with a handle portion 58 on which a handle 59 may be mounted in any suitable manner. As shown in FIG. 2, a pin 60 is carried by and extended downwardly from cam actuator 54 so as to be in sliding engagement with cam 48. Cam surface 55 of cam 48 is inclined with respect to the path of movement of cam actuator 54 so that movement of the cam actuator from right to left as viewed in FIG. 3 causes cam support 45 and flexible arm 42 to shift toward mounting plate 28. Thus the spacing between actuator button 41 and flexible arm 42 may be varied so as to vary the temperature at which thermostat 29 causes contacts 43 and 44 to open and close. Contacts 43 and 44 are of course arranged in a control system (not shown) suitable for controlling the energization of heating elements 15, 16, 17 and 18, and other operations of the cooking appliance, if desired.

Referring now to the mode of operation and advantages of the present invention, it will be seen that by virtue of their orientation bread temperature responsive arms 30 and 31 and compensating leg 32 are to a substantial degree heated only by the heat sources to which they are intended to respond. Compensating leg 32 receives relatively little radiation from the bread surface and thus can effectively perform its compensating function. Arms 30 and 31 lie closely parallel to the bread surface, and since they are arranged in face to face relationship rather than edgewise relationship with the bread surface they perform in an efficient manner. At the same time, the shadow cast by thermostat 29 on the lower surface of the bread surface, which produces a partially untoasted area, is quite small by virtue of the use of two laterally spaced arms 30 and 31 rather than a single wider arm of equivalent size. This is so because radiated heat from heating elements 17 and 18 strike the portion of the bread adjacent thermostat 29 at various angles and thus two relatively narrow obstructions result in a smaller shadow area than a single obstruction of equivalent size.

In addition to compensating for ambient temperature conditions, compensating leg 32 also functions to shift the position of arms 30 and 31 so as to maintain their average spacing from the bread surface substantially constant throughout the toasting operation. In other words, in the absence of compensating leg 32, arms 30 and 31 would bend away from the bread so that at the conclusion of the toasting operation flanged end portion 34 would be located substantially farther away from the bread than connecting end portion 33. Such a variation in spacing would of course change the heat responsive characteristics of the thermostat in an undesirable manner.

Another advantage of the present invention is that both the bread temperature responsive arms 30 and 31 and the compensating leg 32 may be made from a single sheet of bimetallic material. In this way variations in temperature response resulting in variations in the assembly process and the fact that the characteristics of bimetallic sheet material varies somewhat from batch to batch are minimized. Further, the manner in which thermostat 29 is mounted in cooking chamber 2 provides two advantages, namely, adjustability for calibration purposes and ease of replacement since the thermostat assembly may be removed by simply unscrewing screw 36.

Finally, the present invention may be utilized to control the air temperature in a cooking chamber as well as the duration of a toasting operation, as mentioned above. Thus if current for energizing heating units 15, 16, 17 and 18 is supplied by a circuit arranged to be cyclically opened and closed by contacts 43 and 44 and heat transfer between thermostat 29 and the food is substantially prevented (by means of the aforementioned tray, for example) thermostat 29 will function to cycle the contacts between open and closed position and the temperature maintained in the cooking chamber will depend upon the relative position of cam actuator 54 with respect to cam 48.

In operation during baking thermostat 29 functions in the following manner (graphically illustrated in FIG. 4) to maintain the preselected baking temperature in chamber 2. The gap between tip 41 of actuator rod 39 and flexible arm 42, which is initially set by positioning actuator 54, determines the baking temperature; the greater the gap, the higher the temperature. During the initial heating cycle thermostat 29 is heated by radiation from heating units 17 and 18 as well as the surrounding or ambient air and therefore its temperature rises faster and higher than ambient air temperature. The longer the initial heating cycle lasts the greater the temperature difference between thermostat 29 and ambient air becomes. At the end of the first heating cycle contacts 43 and 44 are opened by actuator rod 39, the heating units are deenergized, and thermostat 29 begins to cool. Its rate of cooling is a function of the degree to which its temperature exceeds ambient air temperature. Further, the ambient air begins to cool and its rate of cooling is a function of the rate at which the walls and other parts of the cooking appliance lose heat to the surrounding atmosphere. The latter rate of course is higher when the cooking appliance is relatively hot than when it is relatively cool. Thus the time interval required for thermostat 29 to cool sufficiently to allow the switch contacts 43 and 44 to close is relatively short when a high baking temperature has been selected. The result is that the heating units remain de-energized for relatively short intervals in the former case (high temperature) and for relatively long intervals in the latter case (low temperature). In this way heat responsive thermostat 29 acts to control oven air temperature even though it is primarily responsive to radiated heat from heating units 17 and 18. Also, overshooting of the preselected baking temperature during initial warm-up is minimized since the heating units are cycled on and off several times before the ambient air temperature reaches the desired level, as illustrated in FIG. 4.

While I have disclosed a particular embodiment of my invention, I do not desire the invention to be limited to the specific construction disclosed, and I intend by the appended claims to cover all modifications within the true spirit and scope of the invention.

I claim:

1. In a cooking appliance including means for supporting a slice of bread in position to be toasted and heating means for toasting the bread mounted in spaced relation to the bread position, a bimetallic thermostat located between said heating means and the bread position, said thermostat comprising a flat elongated bimetallic arm portion in generally parallel face to face relation to the plane of the adjacent bread surface, said arm portion having a first end and a second opposite end, a bimetallic compensating leg portion secured to said first end of said arm portion and extending away therefrom in generally perpendicular relation thereto, said second end of said arm portion being relatively movable in response to heat with respect to the end of said leg portion, support means secured to the end of said leg portion to support the thermostat in the cooking appliance, and means operable by said second end of said arm portion for controlling the operation of the cooking appliance.

2. In a cooking appliance including means for supporting a slice of bread in position to be toasted and heating means for toasting the bread mounted in spaced relation to the bread position, a bimetallic thermostat located between the heating means and the bread position, said thermostat having a flat elongated bimetallic arm portion in generally parallel face to face relation to the plane of the adjacent bread surface, a bimetallic compensating leg portion secured to one end of said arm portion and extending away from the bread surface in generally perpendicular relation thereto, support means secured to the end of said leg portion to support the thermostat in the cooking appliance, the end of said arm portion opposite said one end being free to move, and means operable by said opposite end of said arm portion to control the operation of the cooking appliance.

3. In a cooking appliance including means for supporting a slice of bread in position to be toasted and heating means for toasting the bread mounted in spaced relation to the bread position, a bimetallic thermostat located between said heating means and the bread position, said thermostat having a flat elongated bimetallic arm portion in generally parallel face to face relation to the plane of the adjacent bread surface, a bimetallic leg portion secured to one end of said arm portion and extending away from the bread surface in generally perpendicular relation thereto, said arm and leg portions being integrally formed from a single bimetallic sheet, support means secured to the end of said leg portion to support the thermostat in the cooking appliance, the end of said arm portion opposite said one end being free to move, and means operable by said opposite end of said arm portion to control the operation of the cooking appliance.

4. In a cooking appliance including means for supporting a slice of bread in position to be toasted and heating means for toasting the bread mounted in spaced relation to the bread position, a bimetallic thermostat located between the heating means and the bread position, said thermostat having a pair of spaced apart flat elongated bimetallic arm portions in generally parallel face to face relation to the plane of the adjacent bread surface, a bimetallic compensating leg portion secured between one pair of adjacent ends of said arm portions and extending away from the bread surface in generally perpendicular relation thereto, support means secured to the end of said leg portion to support the thermostat in the cooking appliance, the ends of said arm portions opposite said pair of adjacent ends being free to move, and means operable by said opposite ends of said arm portions to control the operation of the cooking appliance.

5. In a cooking appliance including means for supporting a slice of bread in position to be toasted and heating means for toasting the bread mounted in spaced relation to the bread position, a bimetallic thermostat located between said heating means and the bread position, said thermostat having a pair of spaced apart flat elongated bimetallic arm portions in generally parallel face to face relation to the plane of the adjacent bread surface, a bimetallic leg portion secured between one pair of adjacent ends of said arm portions and extending away from the bread surface in generally perpendicular relation thereto, said arm and leg portions being integrally formed from a single bimetallic sheet, support means secured to the end of said leg portion to support the thermostat in the cooking appliance, the ends of said arm portions opposite said pair of adjacent ends being free to move, and means operable by said opposite ends of said arm portions to control the operation of the cooking appliance.

6. In a cooking appliance including means for supporting a slice of bread in position to be toasted and heating means for toasting the bread mounted in spaced relation to the bread position, a bimetallic thermostat located between the heating means and the bread position, said thermostat having a flat elongated bimetallic arm portion in generally parallel face to face relation to the plane of the adjacent bread surface, a bimetallic compensating leg portion secured to one end of said arm portion and extending away from the bread surface in generally perpendicular relation thereto, support means secured to the end of said leg portion to support the thermostat in the cooking appliance, the end of said arm portion opposite said one end being free to move, and means operable by said opposite end of said arm portion to control the operation of the cooking appliance, said means including a depending actuator arm generally parallel to said compensating leg portion, a movable actuator rod secured to said actuator arm, and switch means operable by said actuator rod.

7. In a cooking appliance including means for supporting a slice of bread in position to be toasted and heating means for toasting the bread mounted in spaced relation to the bread position, a bimetallic thermostat located between the heating means and the bread position, said thermostat having a pair of spaced apart flat elongated bimetallic arm portions in generally parallel face to face relation to the plane of the adjacent bread surface, a bimetallic compensating leg portion secured between one pair of adjacent ends of said arm portions and extending away from the bread surface in generally perpendicular relation thereto, support means secured to the end of said leg portion to support the thermostat in the cooking appliance, the end of said arm portions opposite said pair of adjacent ends being free to move, and means operable by said opposite ends of said arm portions to control the operation of the cooking appliance, said means including a depending actuator arm generally parallel to said compensating leg portion, a movable actuator rod secured to said actuator arm, and switch means operable by said actuator rod.

8. In a cooking appliance including means for supporting a slice of bread in position to be toasted and heating means for toasting the bread mounted in spaced relation to the bread position, a bimetallic thermostat located between said heating means and the bread position, said thermostat having a pair of spaced apart flat elongated bimetallic arm portions in generally parallel face to face relation to the plane of the adjacent bread surface, first and second end portions respectively connecting the adjacent pairs of ends of said arm portions, a bimetallic leg portion secured to said first end portion and extending away from the bread surface in generally perpendicular relation thereto, said arm, end and leg portions being integrally formed from a single bimetallic sheet, support means secured to the end of said leg portion to support the thermostat in the cooking appliance, said second end portion being free to move as the temperature of said thermostat changes, and means connected to said second end portion and movable thereby to control the operation of the cooking appliance.

9. In a cooking appliance including a food supporting rack and heating means spaced from said rack for heating food supported on said rack, a bimetallic thermostat positioned between said rack and said heating means, said thermostat comprising a flat elongated bimetallic arm portion positioned adjacent and parallel to said rack and having a first end and a second opposite end, a bimetallic compensating leg portion secured to said first end of said arm portion and extending toward said heating means in generally perpendicular relation to said arm portion, said second end of said arm portion being relatively movable in response to heat with respect to the end of said leg portion, support means secured to one of said leg portion and said second end for supporting the thermostat in the appliance, and means operable by the other of said leg portion and said second end for controlling the operation of the cooking appliance.

10. In a cooking appliance, a food supporting rack, heating means spaced from said rack for heating food supported on said rack, a bimetallic thermostat comprising a flat elongated bimetallic arm portion having a first end and a second opposite end, a bimetallic compensating leg portion secured to said first end of said arm portion and extending away therefrom in generally perpendicular relation thereto, said second end of said arm portion being relatively movable in response to heat with respect to the end of said leg portions, support means secured to one of said leg portion and said second end for supporting the thermostat between said rack and said heating means with the flat surface of said arm portion being positioned in generally parallel face to face relation to said rack, and means operable by the other of said leg portion and said second end for controlling the operation of the cooking appliance.

References Cited in the file of this patent

UNITED STATES PATENTS

| | | |
|---|---|---|
| 1,857,025 | Hurxthal | May 3, 1932 |
| 2,171,344 | Persons | Aug. 29, 1939 |
| 2,171,895 | Sardeson | Sept. 5, 1939 |
| 2,179,422 | Myers | Nov. 7, 1939 |
| 2,491,088 | Clayton | Dec. 13, 1949 |
| 2,616,358 | Stevenson et al. | Nov. 4, 1952 |
| 2,667,115 | Vogelsberg | Jan. 26, 1954 |
| 2,796,492 | Lawser | June 18, 1957 |
| 2,942,081 | Ramsey et al. | June 21, 1960 |